Aug. 9, 1932.  A. JENKINS  1,870,363
PROCESS OF MAKING FISH BOWLS
Filed Dec. 20, 1930
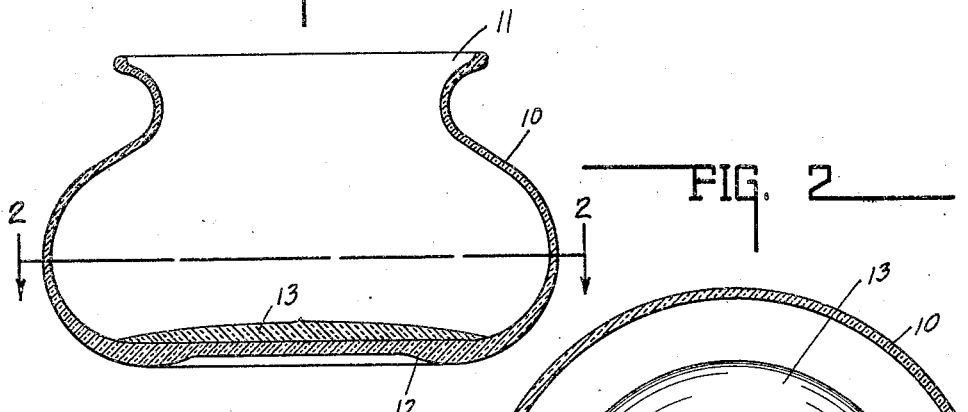
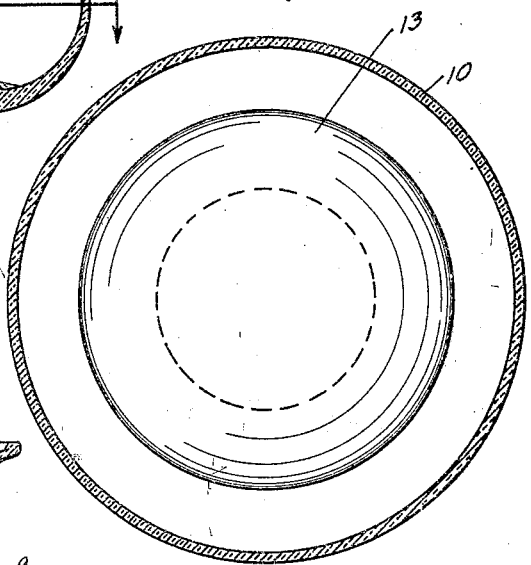
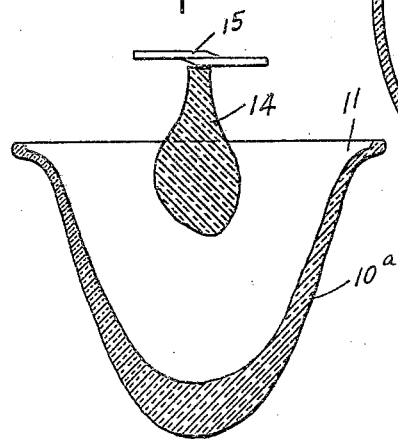
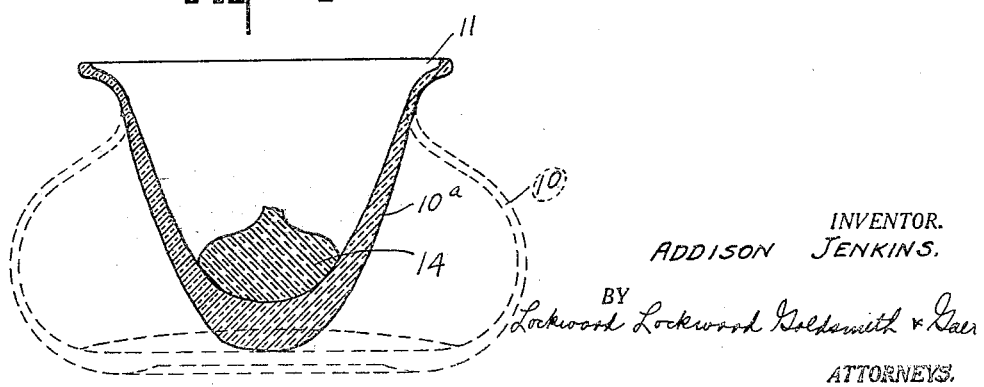
INVENTOR.
ADDISON JENKINS.
BY
Lockwood Lockwood Goldsmith & Dyer
ATTORNEYS.

Patented Aug. 9, 1932

1,870,363

UNITED STATES PATENT OFFICE

ADDISON JENKINS, OF KOKOMO, INDIANA, ASSIGNOR TO D. C. JENKINS GLASS COMPANY, OF KOKOMO, INDIANA, A CORPORATION

PROCESS OF MAKING FISH BOWLS

Application filed December 20, 1930. Serial No. 503,625.

This invention relates to the construction of a vessel such as a fish bowl or the like, and the process of making the same wherein it is desired to give an artificial tint or lighting effect to the water or other liquid contained therein.

The principal feature of the invention resides in the formation of a colored glass bottom, preferably green, formed in the bottom of a vessel and fused therein before the vessel has been finally formed and while it is still in a semi-molten state, the colored glass bottom giving a tint to the fluid above in the usual manner. Thus, wherein there is a green bottom formed in a vessel containing water, a desirable greenish tint is given thereto.

Another feature of the invention resides in the process of providing a false bottom or the inner surface of the bottom of a vessel with a different colored glass so as to be fused therewith and become a part thereof. This is accomplished by dropping a gob of molten glass of a different color through the open top of the vessel onto the central portion of the bottom thereof while the vessel is in the form of a parison and in a semi-molten state. Thereafter, the vessel is blown to the final shape while the molten gob of different colored glass is caused to spread and fuse therewith until it becomes a relatively thin flat button spreading over substantially the entire surface of the bottom of the vessel.

The full nature of the invention will be understood from the accompanying drawing and the following description and claim.

Fig. 1 is a central vertical section through a fish bowl with the colored bottom formed therein. Fig. 2 is a section taken on the line 2—2 of Fig. 1. Fig. 3 is a section through the parison with a gob of colored glass being dropped therein. Fig. 4 is the same as Fig. 3 showing the gob dropped onto the bottom of the parison, the final form thereof being indicated by dotted lines.

In the drawing there is shown a vessel, particularly illustrated herein as a fish bowl 10, having an open mouth 11 and a bottom 12. Fused in the bottom thereof there is a button 13 formed of a colored glass.

As illustrated in Fig. 3, the vessel 10, consisting of plain glass is first formed as a parison 10a, and while the glass is still in a semi-molten condition, a gob 14 of differently colored glass is cut by the shears 15 and dropped through the mouth of the parison centrally onto the bottom thereof so as to impinge thereon as indicated in Fig. 4, whereupon the parison is given its final shape in the usual manner, and the flat bottom-like button 13 as indicated in dotted lines in Fig. 4 and full lines in Figs. 1 and 2.

By means of the above process a cheap and simple structure and method of coloring the bottom of a vessel is provided for giving a desired tint to the fluid contained therein.

The invention claimed is:

The process of making a glass vessel consisting in first forming a parison of glass, and while in a semi-molten state dropping onto the interior of the bottom thereof a gob of molten glass having a different color and thereafter forming the parison into final shape, during which formation the gob spreads and fuses with the glass forming the bottom thereof.

In witness whereof, I have hereunto affixed my signature.

ADDISON JENKINS.